United States Patent [19]
Keith et al.

[11] 3,896,616
[45] July 29, 1975

[54] PROCESS AND APPARATUS

[75] Inventors: Carl D. Keith, Summit; John J. Mooney, Wyckoff, both of N.J.

[73] Assignee: Engelhard Minerals & Chemicals Corporation, Murray Hill, N.J.

[22] Filed: Apr. 21, 1972

[21] Appl. No.: 246,174

[52] U.S. Cl. ............ 60/274; 23/288 F; 60/284; 60/286; 60/289; 60/301; 423/213.7
[51] Int. Cl. ............ F02b 75/10
[58] Field of Search ............ 60/274, 284, 286, 301, 60/289, 290, 303, 300; 23/288 F; 423/212, 213, 214, 213.5, 213.7, 213.2; 123/180 AC

[56] References Cited
UNITED STATES PATENTS

| | | | |
|---|---|---|---|
| 1,154,171 | 9/1915 | Brownlee | 423/213.7 |
| 1,902,160 | 3/1933 | Frazer | 60/301 |
| 2,674,521 | 4/1954 | Houdry | 60/301 |
| 3,072,457 | 1/1963 | Bloch | 60/301 |
| 3,186,806 | 6/1965 | Stiles | 60/301 |
| 3,389,972 | 6/1968 | Pottharst | 60/299 |
| 3,402,015 | 9/1968 | Hardison | 60/303 |
| 3,565,574 | 2/1971 | Kearby | 60/301 |
| 3,599,427 | 8/1971 | Jones | 60/301 |
| 3,662,540 | 5/1972 | Murphey | 60/289 |
| 3,674,423 | 7/1972 | Klimisch | 423/213.2 |
| 3,696,618 | 10/1972 | Boyd | 60/276 |
| 3,751,914 | 8/1973 | Pollock | 60/284 |
| 3,757,521 | 9/1973 | Tourtellotte | 60/286 |
| 3,768,259 | 10/1973 | Carnahan | 60/285 |
| 3,809,743 | 5/1974 | Unland | 60/301 |

OTHER PUBLICATIONS

Lichty, L. C., Internal Combustion Engines, McGraw-Hill, 1951, p. 146 relied on.

*Primary Examiner*—Douglas Hart
*Attorney, Agent, or Firm*—Morton, Bernard, Brown, Roberts and Sutherland

[57] ABSTRACT

Exhaust gases from internal combustion engines are purified by catalytic treatment. The systems have an initial catalyst, preferably in a separate vessel near the engine, and a subsequently-in-line catalyst. Preferably, the catalysts are of the honeycomb-type. The exhaust gases and an excess of oxygen, with or without a supplemental fuel, are passed through the initial catalyst during the start-up of the engine to insure that the exhaust gases are purified more or less as soon as the engine begins operation. In order to reduce the amount of nitrogen oxides in the exhaust gas after start-up, an excess of extraneous fuel is fed to the initial catalyst to reduce nitrogen oxides to nitrogen. The subsequently-in-line catalyst serves to reduce the carbon monoxide and hydrocarbon contents of the exhaust gases.

10 Claims, 1 Drawing Figure

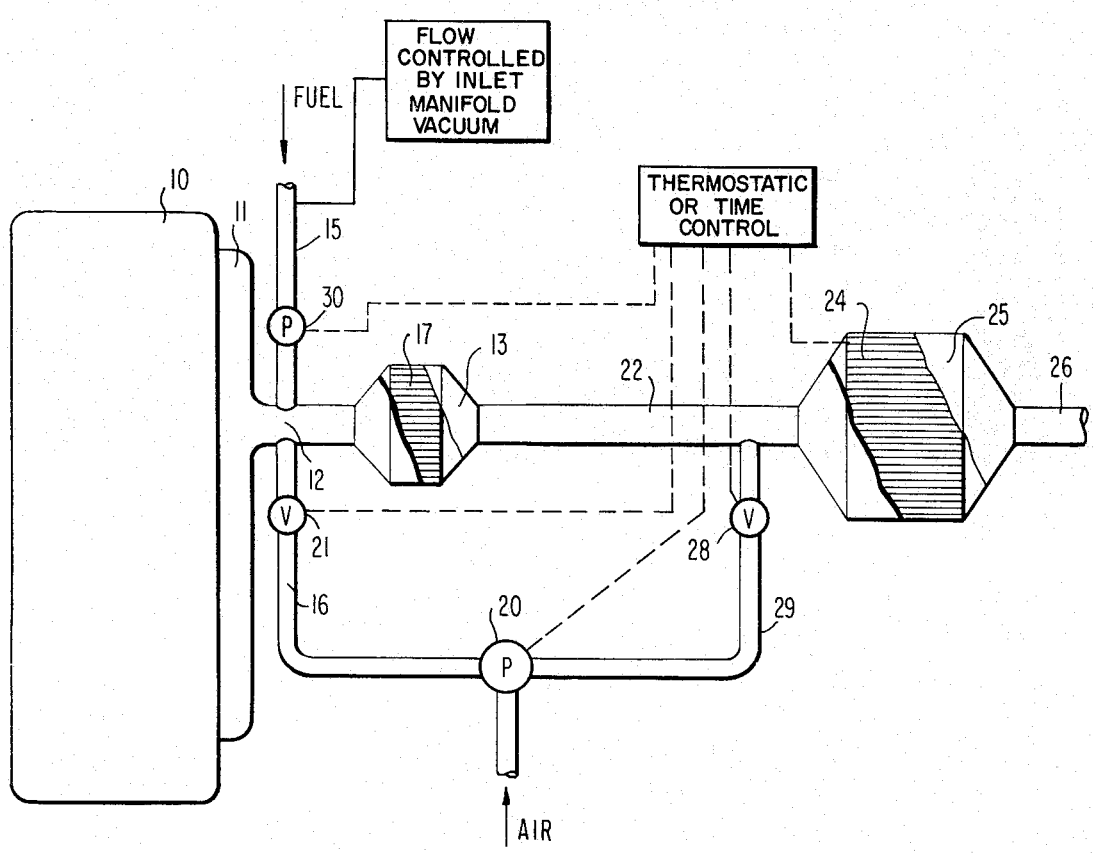

PROCESS AND APPARATUS

This invention relates to catalytic processes and apparatus suitable for purifying gases, and the invention finds particular utility in the treatment of exhaust gases from internal combustion engines in order to decrease pollution of the atmosphere. The invention is especially concerned with overcoming pollution problems associated with engine start-up and during subsequent operation of the engine when nitrogen oxides appear in the exhaust gases in undesirable amounts.

Gases of various sorts are often discharged or exhausted into the air and frequently these gases serve to add undesirable materials or pollutants to the atmosphere. Although the problem has been under study for years and many different types of systems have been devised for combatting the difficulties, it is becoming increasingly important that such pollution be avoided. Particular problems arise in the purification of exhaust gases emanating from internal combustion engines such as those employed in automotive vehicles. The exhaust products from the engines, which usually burn a hydrocarbon fuel such as hydrocarbon gases, gasoline or diesel fuel, can cause serious pollution of the atmosphere. Among the pollutants in these exhaust gases are hydrocarbons and oxygen-containing compounds, the latter including nitrogen oxides and carbon monoxide. The removal of these contaminants from the gases or the conversion of the pollutants to less objectionable materials is of significant importance to the well-being of our society.

The most practical systems devised for treating these exhaust gases employ catalysts which serve to convert the pollutants to less harmful materials by, for instance, oxidation. Typically, the exhaust gases and air are passed over the catalyst which is at an elevated temperature maintained as a result of the heat in the exhaust gases and the exothermic nature of the oxidation reactions. Due to the inherent difficulties of such systems which frequently arise because of limitations of space and costs, the design of the systems is important if the catalyst is to perform adequately over significant periods of engine operating time. During start-up of even well-designed current commercial engines, the amounts of carbon monoxide and hydrocarbons in the exhaust gas are higher than during normal engine operation, and may be at start-up of the order of about 3 to 10 or more volume % carbon monoxide (versus about 0.5 to 3% CO during normal operation), and about 750 to 2000 parts per million (ppm) of hydrocarbons (versus about 100 to 750 parts per million during normal operation), and yet, at this time when it is most needed, the catalytic converter may be ineffective since its temperature may be too low to initiate the desired oxidation reactions. Of course, as engine operation continues, the catalyst is brought to a temperature where it does cause the oxidation reactions to commence and the resulting exothermic heat, along with the heat of the exhaust gases, raises the catalysts to operating temperature, but in the meantime, excessive amounts of carbon monoxide and hydrocarbons may have been discharged to the atmosphere. Thus, during the initial start-up period of the engines, there results an objectionably high discharge of pollutants into the atmosphere, and this is particularly true of engines and their exhaust systems which have cooled to a substantial extent from operating temperature. "Cold" engines, i.e., those which are essentially at atmospheric temperature, are a considerable problem in this regard.

One might avoid these start-up difficulties by electrically heating the catalytic converter before starting the engine, but this would unduly increase costs and also cause unacceptable delays before the engine could be started with the assurance that undesirable pollution of the atmosphere would not occur. In fact, this initial pollution in modern, well-designed engines may be a controlling factor in satisfying some regulations which are being promulgated with regard to the operation and control of internal combustion engines. For example, in one regulation, the pollutant output of the engine is measured for an initial period starting from a cold engine, and many engines will not satisfy the specifications because in the first period of operation, while the catalytic converter is at a relatively ineffective temperature, the emissions of carbon monoxide and hydrocarbons from the exhaust system are excessive and even a major amount of the total of such pollutants that are passed to the atmosphere over the total test period, for instance, in the first 200 seconds of engine operation, there may occur about 85 to 90% of the CO and hydrocarbons discharged over the total test period.

For many years, the designers of catalytic conversion systems for these exhaust gases have recommended that the devices be placed as close to the engine as physically possible to minimize the emission of pollutants during the initial engine start-up period. The closer the catalyst is to the engine, the hotter will be the exhaust gas when it contacts the catalyst and the faster the temperature of the catalyst wil be raised to operating level. However, due to limitations of space in most vehicles, the location of the total amount of catalyst in the system near the engine is difficult and as a result, the catalyst has sometimes been placed in a plurality of vessels, one of which may be more or less immediately adjacent the engine exhaust manifold while another catalytic converter is in the general vicinity of the usual muffler and thus is beneath or to the rear of the passenger section of the vehicle. In any event, the portion of the catalyst in the initial vessel has a better chance to reach an effective operating temperature in a relatively short time and can therefore serve quicker to initiate the oxidation reactions during the engine start-up period. This heating is facilitated by the fact that the amount of catalyst in the initial converter is frequently a minor portion of the total amount of catalyst in the system and is heated quicker than if the total catalyst were in one vessel near the engine. As the exhaust gases pass through the first catalytic converter, the oxidation reactions occur and the exothermic reactions serve to heat the catalyst and the exhaust gases. Typically, the conversion of 1% of carbon monoxide in a gas to carbon dioxide or of 1,000 parts per million of $C_6H_{14}$ organic material to carbon dioxide and water, raises the temperature of the gas about 90°C. The heated gases are then passed to the subsequent catalyst converter in the system and act to heat its catalyst to an effective temperature sooner than would normally occur if part of the catalyst were not placed near the exhaust manifold of the engine. Less advantageously from the quick heating standpoint, the initial catalyst may be positioned further away from the exhaust manifold and even housed in the same vessel as the subsequent catalyst.

The foregoing described multiple catalyst converter operations are advantageous, but problems may also arise in these systems and cause them to be ineffective in satisfying pollution regulations. The initial catalyst is generally a minor weight amount of the total catalyst in the exhaust system, but yet the initial catalyst contacts the most contaminated exhaust gases and is thus subjected to the greatest amounts of catalyst poisons. Also, when the initial catalyst is located near the engine, the catalyst may be subjected to higher temperatures over long periods of time which can also lead to undesirably short catalyst life. To reduce these detrimental effects, it has been proposed to devise a system with a by-pass around the initial catalyst so that the exhaust gases pass through this portion of the catalyst only during the period when the subsequently-in-line catalyst is below an effective operating temperature, for instance, during start-up of a cold engine. In this type of operation, it has been suggested that the by-pass be thermostatically controlled according to the temperature of the subsequently-in-line catalyst. Even in this system, however, sufficient reduction of the amount of pollutants passed into the atmosphere may not occur and it is therefore becoming imperative to improve such operations.

Aside from these pollution problems associated with the start-up of internal combustion engines, another pollution difficulty arises due to formation of nitrogen oxides during combustion of the fuel in the engine which oxides also appear in the exhaust gases and contaminate the atmosphere. These oxides are not destroyed by the usual catalyst employed to reduce the amounts of carbon monoxide and hydrocarbon constituents in the exhaust gas, and, as a result, other approaches to solve this problem must be used. The formation of nitrogen oxides is generally not significant during engine start-up. Thus, the lower temperature in the engine and the rich fuel-air conditions which may exist during start-up cause less production of these oxides. However, after the start-up period, the formation of nitrogen oxides becomes a problem, particularly when engine inlet manifold pressure is less than about 20 inches of mercury absolute, i.e. the manifold vacuum is greater than about 10 inches of mercury.

By the present invention, we have devised processes and apparatus for purifying exhaust gases, especially those which emanate from multiple cylinder, reciprocating internal combustion engines. Our systems have features which define highly advantageous operations with excellent purification of the exhaust gases during engine start-up periods, and during subsequent periods of engine operation when there is greater production of nitrogen oxides which appear in the engine exhaust gases. In the systems of the present invention, we employ an initial catalyst, preferably in a converter vessel placed near the engine, for instance, closely adjacent the exhaust manifold; and a subsequently-in-line catalyst. The latter catalyst may be housed in the same vessel as the initial catalyst, but preferably the subsequent catalyst is in a separate vessel which is in a spaced-away flow relationship with respect to the initial catalyst vessel. During the engine start-up period, the exhaust gases are passed from the engine to the initial catalyst and through a subsequently-in-line catalyst. The initial catalyst can be with advantage of the unitary or honeycomb-type and preferably contains as an active catalytic member, one or more of the elements of the platinum group, especially palladium, supported by a carrier such as a calcined or activated alumina.

When contacting the initial catalyst during start-up, the exhaust gases may be combined with an extraneous or supplemental fuel, and in any event, the exhaust gas mixture in contact with the initial catalyst includes an excess of molecular oxygen based on the stoichiometric amount needed to convert all the oxidizable constituents of the gas and any addition of fuel to carbon dioxide and water. The oxygen can be supplied by the engine, for instance, in a lean fuel operation, but the engine is usually operated on the fuel-rich side during start-up. It is thus usually necessary to introduce oxygen into the exhaust gases before or as they contact the initial catalyst. The effluent gases from the initial catalyst are charged into a subsequent-in-line catalyst during the engine start-up period, and as a result, the subsequent catalyst is brought to or near a temperature at which it is effective to promote the desired oxidation reactions. By these features and mode of operation of the systems of the present invention, excellent purification of the exhaust gas is obtained during engine start-up periods.

After the engine has been started and warmed-up at least to some extent, the initial catalyst is no longer needed for the oxidation of carbon monoxide and hydrocarbons in the exhaust gases since the subsequent-in-line catalyst has, by this time, been heated sufficiently to promote these reactions or at least the oxidation of carbon monoxide to carbon dioxide which will further heat the catalyst. Such temperatures are often at least about 350°F., preferably about 500° to 1,400°F., and may depend on the composition of the catalyst. According to the present invention, however, the initial catalyst is employed after the engine start-up period to reduce the amount of nitrogen oxides in the engine exhaust gas. In order to accomplish this result, the exhaust gases are combined with additional fuel, sometimes hereinafter referred to as an extraneous, secondary or supplemental fuel, in an amount to insure that the resulting exhaust gas-fuel mixture is on the rich-fuel side with respect to the molecular oxygen and nitrogen oxides present in the mixture. Thus, the exhaust gas-fuel mixture has an excess of fuel based on the oxygen content being converted to $CO_2$ and $H_2O$ and the nitrogen oxides being converted to nitrogen. Preferably, the excess of fuel is at least about 5 or 10% more than is needed for these reactions. Oxygen appears in the exhaust gas as the result of one or both of the engine being operated on the fuellean side with respect to the fuel-oxygen mixture fed to the engine, and incomplete combustion of the fuel in the engine. The mixture of exhaust gas and extraneous fuel is passed in contact with the initial catalyst which is at a temperature of at least about 350°F., preferably about 500° to 1400°F. The nitrogen oxides in the mixed exhaust gas-fuel stream are thereby reduced in the initial catalyst to molecular nitrogen, oxygen, and possibly some ammonia. The effluent from the initial catalyst is then passed to the subsequent-in-line catalyst, along with additional molecular oxygen which is charged to the system downstream of the initial catalyst when it is used to reduce the nitrogen oxide content of the exhaust gas according to this invention. The total oxygen content of the gases entering this downstream catalyst is usually in excess with respect to the carbon monoxide and organic, oxidizable constituents of the gases, and this catalyst serves to oxidize carbon monoxide and hydrocarbon constituents of the gaseous charge to carbon dioxide and water. The effluent from this catalyst can be passed into the atmosphere and is relatively free of nitrogen oxides, carbon monoxide and hydrocarbons. Other features and advantages of the invention will be realized from the following, more detailed description of certain specific embodiments of the process and apparatus of the invention.

The invention will be further described in connection with the accompanying drawing in which a system of the present invention is shown diagrammatically for illustrative purposes.

In the drawing, there is shown a multiple cylinder, spark-ignition, internal combustion engine 10 of the automotive-type having an exhaust manifold 11. The initial catalyst is in converter 13 which is placed closely adjacent the engine manifold, and preferably close enough so that the gas inlet side of the catalyst element 17 in the converter can reach a temperature of at least about 400°F. within about 20 seconds of the beginning of sustained engine combustion, preferably at least about 400°F. within about 10 seconds, when the engine and its exhaust system are at a temperature of about 68° to 86°F. before starting. Such distance may be, for instance, less than about 12 inches from the manifold with respect to the mean flow path of the exhaust gases, and this distance is preferably less than about 6 inches. When the initial catalyst is about 18 or more inches from the exhaust manifold, the catalyst is accordingly heated more slowly. During start-up of the engine 10, the exhaust gases are passed from manifold 11 through line 12 and into catalytic converter 13 (shown partly broken-away) which houses a honeycomb-type catalytic element 17 having an active metal component comprising a platinum group metal. An extraneous fuel can, if desired, be added through line 15 to the exhaust gas in line 12 during the engine start-up period to insure that the initial catalyst is brought quicker to a temperature which initiates and sustains oxidation of carbon monoxide and preferably also hydrocarbons, in the exhaust gas. As shown schematically in the drawing, line 15 can have a restricted orifice and the upstream pressure on the fuel can be varied so that the amount of fuel fed through the orifice and thus into line 12 is higher at higher inlet manifold vacuums.

Molecular oxygen needed to support the oxidation of any extraneous fuel and oxidizable constituents of the exhaust gas can be present in the gas passing from the engine when it is operated on a lean fuel-oxygen mixture, but preferably most of the oxygen in the gases passing to the initial catalyst during engine start-up may be added in the form of air or other oxygen-containing gas, for instance, by line 16 which discharges into line 12. Air is supplied to line 16 by electric air pump or belt-driven fan 20 through valve 21. Pump 20, when electric, can operate whenever the ignition system of the vehicle is in the on position. The oxygen introduction is preferably conducted via line 16 throughout the start-up period of the engine and is conducted at least whenever the oxygen content of the exhaust gases is below the excess required for combustion of any fuel added during the engine start-up period and for combustion of the combustible or oxidizable constituents in the exhaust gas during this period of engine operation.

Referring again to the drawing, the gases emanating from the initial catalyst converter 13 are discharged through line 22 and passed thereby to the subsequently-in-line catalyst converter 25 (shown partly broken-away) which also contains an oxidation catalyst 24, preferably a honeycomb-type catalyst. Throughout the initial start-up period, which may be, for example, from about 1.5 to 5 minutes from the beginning of sustained combustion in or operation of engine 10, preferably about 2 to 4 minutes, and during normal engine operation, the gases are passed through catalytic converter 25 where, during engine start-up, any oxidizable constituents in the gases which have not been converted in catalyst converter 13 may be oxidized. During start-up of the engine, the second-in-line catalyst converter 25 is heated by hot effluent gases coming from the initial catalytic converter 13, and as the temperature rises in catalytic converter 25, its catalyst becomes effective in promoting the various oxidation reactions involving the exhaust gas and any extraneous fuel employed. The effluent from catalytic converter 25 passes by line 26 to the atmosphere. Converter 25 may be spaced away from converter 13 a considerable distance, say at least about 1 foot as measured by the mean gas flow path. More often, this distance is at least about 2 feet and will usually not exceed about 5 to 10 or so feet. Generally, the engine start-up period of this invention can be taken as essentially complete when the inlet end of the subsequent catalyst has reached a temperature of at least about 400°F., and preferably at least about 500°F. Catalyst temperatures usually do not materially exceed about 1,400°F. in either the initial or subsequent catalyst zones throughout operation of the engine.

By the end of the engine start-up period, in accordance with this invention, the subsequent catalyst has been brought to an effective operating temperature and serves adequately to oxidize the carbon monoxide and hydrocarbon pollutants of the gas so that undue contamination of the atmosphere, in these respects, is avoided. However, after the engine start-up period, the exhaust gas from the engine often contains undesirably large amounts of nitrogen oxides and would be objectionable should they be passed into the atmosphere, and this is particularly so when the engine is operating under an engine inlet manifold pressure of less than about 20 inches of mercury absolute, as may occur, for instance, during acceleration of the engine. Due to the conditions existing in the subsequent catalyst, the nitrogen oxide content of the exhaust gas is usually not sufficiently reduced, if at all, at this point.

In accordance with the present invention, after the engine start-up period, and especially when the engine exhaust gases contain relatively large amounts of nitrogen oxides as aforedescribed, an excess of fuel is added to the exhaust gases by line 15, and pump 20 passes molecular oxygen, usually as air, through valve 28 and line 29 to line 22 where it is mixed with the effluent from converter 13. During this period, valve 21 is closed, while during engine start-up, valve 28 is closed. The amount of supplemental fuel supplied by line 15 is often at least about 2 volume %, preferably about 3 to 10 volume %, above that needed stoichiometrically to consume the molecular oxygen in the gas passing to converter 13 by oxidation of the fuel to carbon dioxide and water and to reduce the nitrogen oxides to nitrogen. The amount of oxygen added to the effluent from converter 13 by way of line 29 is in excess of that needed to oxidize in converter 25 essentially all of the carbon monoxide, hydrocarbons and other fuel, if any, in line 22 to carbon dioxide and water. It is realized that this converter may not promote complete oxidation in these regards, but, in any event, the gaseous effluent passing into the atmosphere by way of line 26 will be relatively free of carbon monoxide, hydrocarbons, fuel charged through line 15, and nitrogen oxides when the system is operated according to this invention.

Since extraneous fuel may be added to the exhaust gas by way of line 15 during engine start-up, and is so added in the subsequent operation of converter 13 to reduce nitrogen oxides in the exhaust gas according to this invention, such fuel may enter line 15 at all times of engine operation and thus may be supplied to line 15 by pump 30 whenever the engine is in operation. Alternatively, pump 30 may be stopped when valve 21 is open and valve 28 closed if fuel is not to be supplied by way of line 15 during engine start-up. When, however, converter 13 is being used to reduce the nitrogen oxide content of the exhaust gases, pump 30 is running to add fuel via line 15, and during this period, valve 21 is closed and valve 28 is in open position.

In one form of this invention, the changeover from engine start-up conditions to the use of converter 13 to reduce the amount of nitrogen oxides in the exhaust gas, may be by predetermined time control, as shown schematically in the drawing. Thus, after a set time, e.g. 3 minutes, after the engine is started, valve 21 is closed and valve 28 is opened. Also, if pump 30 were not running during the engine start-up period, the pump is activated at this time to supply supplemental fuel via line 15. When engine operation ceases, valve 21 reopens, valve 28 closes, and pump 30 stops. When the engine is subsequently started, this sequence of operation will occur each time the engine is started, regardless of the temperature of the catalyst in converter 25, to insure against contamination of the atmosphere. By this procedure, it is assured that undesirably large amounts of carbon monoxide, hydrocarbons, and other fuel, and nitrogen oxides will not be present in the exhaust gas going into the atmosphere, and a much more effective and desirable operation is obtained.

Instead of being a timed operation, the operation of valves 21 and 28 and pump 30 may be controlled thermostatically according to the temperature of the catalyst in converter 25 as shown schematically in the drawing. In this operation, valve 21 opens and valve 28 closes when the catalyst in converter 25 is below a temperature sufficient to effect the desired oxidation reactions, but valve 21 would be closed and valve 28 opened when the catalyst in converter 25 is at an effective temperature in this regard. Pump 30 would be operated when valve 28 is open and also, if desired, when valve 21 is open. Alternatively, valve 21 could be open and valve 28 closed only during operation of the automatic choke when the engine is started. Again, pump 30 would supply fuel via line 15 at least when valve 28 is open and also, if desired, when valve 21 is open.

In a preferred operation of the present invention, the engine is an 8-cylinder hydrocarbon gasoline powered, 4-stroke internal combustion engine, operating on a non-leaded fuel of 91 research octane number rating. The exhaust gas during normal engine operation contains about 0.3 to 7 volume % CO, about 100 to 750 p.p.m. by volume of hydrocarbon constituents, and about 1 to 4 volume % oxygen in excess of stoichiometric. The initial converter 13 contains a honeycomb catalyst which is 2-21/32 inches in diameter and an inch thick in the direction of gas flow. The skeleton structure of the honeycomb has walls about 8 mils in thickness and is made of cordierite and alpha-alumina. There are about 180 flow paths per square inch of cross-section of the catalytic element, and the gas flow paths through the element are essentially straight and do no communicate directly with each other through their side walls. The wall of the element has a thin coating of activated alumina which is about 12% by weight of the cordierite-alpha-alumina support. The alumina coating contains about 1% palladium catalyst based on the total weight of the catalytic element.

The catalytic converter 25 contains a honeycomb-type catalyst element having the same cordierite-alpha-alumina support as the catalyst in converter 13; however, the diameter of the element 24 is 4-21/32 inches while its thickness or length is 3 inches. The element has 15 weight % of activated alumina as a thin coating on the walls of the gas flow paths and the alumina contains 0.2 weight % platinum catalyst.

The engine and its exhaust system are at 70°F. when the engine is started. The engine start-up period is 2 minutes from initial sustained combustion during which time air at the rate of 2% by volume in excess of that needed for complete combustion; based on the volume of exhaust gas and extraneous fuel flow, is passed by line 16 into line 12. Throughout this start-up period, methanol as an extraneous fuel is discharged from line 15 into line 12 at the rate of 1% based on the volume of engine exhaust gas flow.

After 2 minutes of such operation, the temperature of the gas inlet end of catalytic element 17 can be, for example, about 800°F., and the temperature of the gas inlet end of catalytic element 24 can be about 500°F. At the end of the 2 minute engine start-up period, valve 28 is moved from the closed to the open position, and valve 21 is closed. Air is then supplied to line 22 via line 29. The extraneous fuel addition is maintained. The exhaust gas-fuel mixture then passes through converter 13, line 22, and along with air from line 29, to catalytic converter 25 and operation of the engine and exhaust gas system is continued. If extraneous fuel from line 15 is to be used only during periods of engine operation in which the production of nitrogen oxides is high, e.g. when the absolute pressure in the inlet manifold is less than about 20 inches of mercury, pump 30 can be actuated by the inlet manifold vacuum only during such periods whether or not it is in operation during engine start-up. Also, during periods when nitrogen oxides content of the exhaust gas is low, the exhaust gas could be by-passed around converter 13 and into line 22.

The amount of extraneous fuel which may be introduced into the exhaust gas in the initial engine start-up period of this invention, may be sufficient to bring the temperature of the gas inlet side of the initial catalyst from about 70°F. to at least about 400°F. within about 20 seconds of initial sustained engine operation, preferably to about 400°F. within about 10 seconds. Such amounts often fall in the range of about 0.5 to 3 volume %, preferably about 0.7 to 1.5 volume %, based on the exhaust gas, but may depend, however, on the heating quality of the fuel, the amount of oxygen present, the distance converter 13 is away from the engine, and other conditions of the operation. The extraneous fuel used during engine start-up and during periods of nitrogen oxide reduction as aforedescribed, may be hydrocarbon in nature and, for instance, boil primarily in the range of up to about 600 F. at atmospheric pressure, and may be a mixture of hydrocarbons having from 3 to 12 carbon atoms. Advantageously, the extraneous fuel consists essentially of carbon, hydrogen, and oxygen, and we prefer to employ an alkanol of 1 to 4 carbon atoms as the extraneous fuel, especially methanol. The extraneous fuel often has a heating value of at least about 5,000, preferably at least about 7,500, BTU per pound based on complete conversion to $CO_2$ and $H_2O$.

The introduction of the extraneous fuel during engine start-up may occur at the beginning of sustained engine operation, and preferably is essentially coincident with the beginning of the engine start-up period. The extraneous fuel should not contain a significant amount of catalyst poisons such as lead or phosphorous. It is preferred to operate the engine with a fuel that is essentially free of these and other catalyst poisons, and this primary engine fuel is usually hydrocarbon in nature or may contain combined oxygen and thus can be of the types described above as extraneous fuels.

The initial catalyst is preferably of the unitary or honeycombtype in a form which promotes the oxidation reactions described above. Converter 13 and its catalyst can be made in accordance with U.S. Pat. Nos. 3,441,381 and 3,565,830. The supported oxidation catalyst can comprise a unitary, solid refractory skeletal structure having, for instance, cordierite as the support. The skeletal structure is usually cylindrical, but not necessarily circular in cross-section, and can have pores in its interior portion and also superficial pores and/or perforations communicating with gas flow channels which extend through the skeletal structure. The channels can be of various shapes in cross-section. An activated, refractory oxide, for instance, a gamma family or activated-type alumina, can be formed on the surface of gas flow channels and also on the surfaces of the superficial pores which communicate with the channels. The more active catalytic metal component can be carried by the active refractory oxide, and can contain, for instance, a platinum group metal, or combinations thereof deposited on the active refractory metal oxide. Some of the catalytic metal may also be deposited directly on the skeletal structure surfaces. Preferably, the catalytic metal component includes a catalytically-effective amount of palladium.

The unitary, skeletal structure support of the initial oxidation catalyst is characterized by having a large plurality of flow channels or paths extending therethrough in the general direction of gas flow. The supported catalyst is usually disposed in a vessel in such fashion that its unitary skeletal structure occupies the major part of the cross-sectional area of the reaction zone. Advantageously, the unitary skeletal structure is shaped to fit the reaction zone of the purifier casing into which it is positioned, and the unitary supported catalyst is placed therein lengthwise as to its cellular gas flow channels, i.e., with the channels extending in the general direction of gas flow between the purifier inlet and outlet, so that the gases flow through the channels during their passage through the vessel. The flow channels need not pass straight through the catalyst structure and may contain flow diverters or spoilers.

The skeletal structure support is preferably constructed of a substantially chemically and relatively catalytically inert, rigid, solid material capable of maintaining its shape and strength at high temperatures, for instance up to about 1100°C. or more. The support may have a low thermal coefficient of expansion, good thermal shock resistance, and low thermal conductivity. Often, the skeletal support is porous but its surface may be relatively non-porous, and it may be desirable to roughen its surfaces so that they hold the catalyst better, especially if the support is relatively non-porous. The support may be metallic or ceramic in nature or a combination thereof. Although the support may be a glass ceramic, it is preferably unglazed and may be essentially entirely crystalline in form and marked by the absence of any significant amount of glassy or amorphous matrices, for instance of the type found in porcelain materials. Further, the skeletal structure may have considerable accessible porosity as distinguished from the substantially non-porous porcelain utilized for electrical applications, for instance in spark plugs, characterized by having relatively little accessible porosity. The walls of the channels of the unitary skeletal support structures can contain a multiplicity of surface macropores in communication with the channels to provide a considerably increased accessible catalyst surface, and a substantial absence of small pores for high temperature stability and strength. Whereas the superficial surface area of such structures may be of the order of about 0.001 to 0.01 square meters per gram, including the channels, the total surface area is preferably many times greater, so that much of the catalytic reaction may take place in the large pores.

The geometric, superficial or apparent surface area of the carrier including the walls of the gas flow channels will often be about 0.5 to 6, preferably 1 to 5, square meters per liter of support. The channels through the unitary body or skeletal structure can be of any shape and size consistent with the desired superficial surface and should be large enough to permit relatively free passage of the gas mixture of exhaust gas, extraneous fuel, and oxygen-containing gas. The channels may be parallel or generally parallel and extend through the support from one side to an opposite side, such channels being separated from one another by preferably thin walls. The channels may also be multidirectional and may even communicate with one or more adjacent channels. The channel inlet openings can be distributed across the entire face or cross-section of the support subject to initial contact with the gas to be reacted. The preferred skeletal structure supports are comprised of cordierite, cordeirite-alpha alumina, zircon-mullite, spodumene, alumina-silica-magnesia and zirconium silicate. Examples of other refractory ceramic materials utilizable in place of the preferred materials as support or carrier are sillimanite, magnesium silicates, zircon, petalite, alpha-alumina and aluminosilicates.

The gas flow channels of the unitary, skeletal supported catalyst may be thin-walled channels providing a relatively large amount of superficial surface area. The channels can be one or more of a variety of cross-sectional shapes and sizes. The channels can be of the cross-sectional shape of, for example, a trapezoid, rectangle, square, sinusoid, or circle so that cross-sections of the support represent a repeating pattern that can be described as a honeycomb, corrugated or lattice structure. The walls of the cellular channels are generally of the minimum thickness will often fall in the range of about 2 to 10 mils. With this wall thickness, the structures may contain from about 100–2500 or more gas inlet openings for the flow channels per square inch and a corresponding number of the gas flow channels, preferably about 150 to 500 gas inlet and flow channels per square inch. The open area of the cross-section may be in excess of 60% of the total area. The size and dimensions of the unitary refractory skeletal support of this invention can be varied.

The refractory oxide in the preferred embodiment of the catalyst is deposited on the unitary skeletal support as continuous or discontinuous thin deposits preferably of thickness of about 0.0004 to 0.001 inch. Such catalytically-active oxides may be a calcined refractory metal oxide which itself is characterized by a porous structure and which possesses a relatively large internal pore volume and total surface area. Generally, the total surface area of the active refractory oxide is at least about 25 square meters/gram, preferably at least about 100 square meters/gram. Such oxides can be prepared by dehydrating a hydrate form of the oxide by calcination, usually at temperatures of about 150°C. to 800°C. The preferred active oxides contain members of the gamma or activated alumina family, such as gamma or eta alumina, which can be prepared, for instance by precipitating a hydrous alumina gel and thereafter drying and calcining to expel hydrated water and provide the active alumina. A particularly preferred active refractory metal oxide is obtained by drying and calcining at temperatures of about 300°C. to 800°C., a mixture of precursor hydrous alumina phases predominating in crystalline trihydrate, that is, containing in excess of about 50% of the total alumina hydrate composition, preferably at least about 65%, of one or more of the trihydrate forms gibbsite, bayerite and nordstrandite as determined by X-ray diffraction. The substantial balance of the hydrate may be amorphous, hydrous, or boehmite alumina or their mixtures. Other suitable active oxides include, for example, active or calcined beryllia, zirconia, magnesia, silica, spinels, etc., and combinations of oxides such as boria-alumina, thoria-alumina, titania-alumina, zirconia-alumina, silica-alumina, alumina-alkaline earth metal oxides, etc. Preferably, the activated refractory oxide is composed predominantly of oxides of one or more metals of Groups II, III and IV having atomic numbers not exceeding 40. The active refractory oxide deposit may constitute, for example, about 10 to 150 grams per liter of the unitary support, preferably about 30 to 120 grams per liter.

The initial catalyst used in this invention may contain platinum group metals, e.g., platinum, rhodium, ruthenium, palladium or iridium, base metals, or combinations thereof, or their oxides or other combined forms. The metal is present in a catalytically-effective amount, and is usually a minor weight percent of the total catalytic element 17, e.g. about 0.01 to 2 wt. % of the platinum group metal, preferably about 0.1 to 1.5%. The catalytic element may contain, with or without the platinum group metals, one or more catalytic materials which may include, for example, chromium, manganese, vanadium, copper, iron, cobalt, nickel, rare earths, and the like.

The relative sizes of the initial and subsequent catalytic elements may be such that their volume ratio, i.e. the superficial volume of the subsequent catalyst to the initial catalyst, including void spaces within the catalytic masses, is often at least about 2:1, preferably at least about 10:1. This ratio usually does not exceed about 100:1, and preferably is not above about 50:1. Thus, the gas space velocity in the initial catalyst will often be greater than in the subsequent catalyst. The subsequent catalyst may often have a length to diameter ratio of about 0.1:1 to 2:1, preferably about 0.5:1 to 1:1, while the initial catalyst may have a length to diameter ratio of about 0.1:1 to 10:1, preferably about 1:1 to 3:1.

Although it is preferred that the subsequent catalyst, e.g., that in element 24, be of the honeycomb or unitary type as described above with respect to the initial catalyst, either or both catalysts may be composed of particulate catalysts or pellets. Such particles often have diameters of about one sixty-fourth to one-half inch, preferably one thirty-second to one-fourth inch, and, if not spherical, lengths of about 1/64 to 1 inch or somewhat more, preferably about one thirty-second to one-fourth inch. These catalyst particles can be arranged in various configurations, but often cylindrical beds are employed.

Although it is preferred that the subsequent catalyst, whether in unitary, particulate or other form, contain one or more platinum group metals as a catalytically-active component, other materials may form part or all of the active component. These other active materials include the base metals and thus the subsequent catalyst may contain one or more of the platinum group metals, especially platinum or palladium, iron group metals, vanadium, manganese, copper, tungsten, and the like, in metallic or combined forms such as the oxides or sulfides. Also, these active materials may be carried by catalytically active or inactive, solid supports of, for instance, the types described above with respect to the initial catalyst, or combinations of such active and inactive materials. When supported, the catalysts often, but not necessarily, have a minor weight amount of the catalytically-active metal component.

It is claimed:

1. A method for oxidizing constituents of exhaust gas from an internal combustion engine, said gas containing carbon monoxide, hydrocarbon, and nitrogen oxides which comprises:

passing during start-up of the engine said gas and an excess of molecular oxygen to a first catalyst;

passing effluent gases from said first catalyst to a subsequent catalyst in sequential gas flow relationship with respect to said first catalyst, at least until said subsequent catalyst is at a temperature sufficient to promote the oxidation of carbon monoxide in said exhaust gas;

subsequently passing added fuel, molecular oxygen, and nitrogen oxides-containing exhaust gas from the engine to said first catalyst, the fuel being added only when the engine inlet manifold is at an absolute pressure of less than about 20 inches of mercury, the amount of fuel being in excess of that stoichiometrically required to consume said oxygen by oxidation of the fuel and to reduce the nitrogen oxides in said gas; and passing the effluent gases from said first catalyst and molecular oxygen to said subsequent catalyst to reduce the carbon monoxide and hydrocarbon contents of said gases by oxidation.

2. A method for oxidizing constituents of exhaust gas from an internal combustion engine, said gas containing carbon monoxide, hydrocarbon, and nitrogen oxides which comprises:

passing during start-up of the engine said gas, an excess of molecular oxygen and an added fuel to a first catalyst;

passing effluent gases from said first catalyst to a subsequent catalyst in sequential gas flow relationship with respect to said first catalyst, at least until said subsequent catalyst is at a temperature sufficient to promote the oxidation of carbon monoxide in said exhaust gas;

subsequently passing added fuel, molecular oxygen, and nitrogen oxides-containing exhaust gas from the engine to said first catalyst, the amount of added fuel being in excess of that stoichiometrically required to consume said oxygen by oxidation of the fuel and to reduce the nitrogen oxides in said gas; and passing the effluent gases from said first catalyst and molecular oxygen to said subsequent catalyst to reduce the carbon monoxide and hydrocarbon contents of said gases by oxidation.

3. A method for oxidizing constituents of exhaust gas from an internal combustion engine having an exhaust manifold, said gas containing carbon monoxide, hydrocarbon and nitrogen oxides, which comprises:

passing during start-up of the engine said gas and an excess of molecular oxygen to a first catalytic converter vessel positioned closely-adjacent said exhaust manifold;

passing effluent gases from said first catalytic converter vessel to a separate catalytic converter vessel positioned in a spaced-away gas flow relationship with respect to said first catalytic converter at least until the catalyst in said second catalytic converter is at a temperature sufficient to promote the oxidation of carbon monoxide in said exhaust gas;

subsequently passing added fuel, molecular oxygen, and nitrogen oxides-containing exhaust gas from the engine to said first catalytic converter, the fuel being added only when the engine inlet manifold is at an absolute pressure of less than 20 inches of mercury, the amount of added fuel being in excess of that stoichiometrically required to consume said oxygen by oxidation of the fuel and to reduce the nitrogen oxides in said gas; and passing the effluent gases from said first converter and an excess of molecular oxygen to said separate catalytic converter to reduce the carbon monoxide and hydrocarbon contents of said gas by oxidation.

4. A method for oxidizing constituents of exhaust gas from an internal combustion engine having an exhaust manifold, said gas containing carbon monoxide, hydrocarbon and nitrogen oxides, which comprises:

passing during start-up of the engine said gas, an excess of molecular oxygen and an added fuel to a first catalytic converter vessel positioned closely-adjacent said exhaust manifold;

passing effluent gases from said first catalytic converter vessel to a separate catalytic converter vessel positioned in a spaced-away gas flow relationship with respect to said first catalytic converter at least until the catalyst in said second catalytic converter is at a temperature sufficient to promote the oxidation of carbon monoxide in said exhaust gas;

subsequently passing added fuel, molecular oxygen, and nitrogen oxides-containing exhaust gas from the engine to said first catalytic converter, the amount of added fuel being in excess of that stoichiometrically required to consume said oxygen by oxidation of the fuel and to reduce the nitrogen oxides in said gas; and passing the effluent gases from said first converter and an excess of molecular oxygen to said separate catalytic converter to reduce the carbon monoxide and hydrocarbon contents of said gas by oxidation.

5. The process of claim 2 in which the added fuel is an alkanol of 1 to 4 carbon atoms.

6. The process of claim 5 in which the alkanol is methanol.

7. The process of claim 2 in which the first catalyst contains palladium as a catalyst.

8. The process of claim 7 in which the added fuel is methanol.

9. The process of claim 4 in which the added fuel is an alkanol of 1 to 4 carbon atoms.

10. The process of claim 9 in which the alkanol is methanol.

* * * * *